United States Patent
Riley et al.

(10) Patent No.: US 7,548,358 B2
(45) Date of Patent: Jun. 16, 2009

(54) PHASE CONJUGATE RECONSTRUCTION OF A HOLOGRAM

(75) Inventors: Brian Riley, Firestone, CO (US); Ken E. Anderson, Boulder, CO (US); Kevin R. Curtis, Longmont, CO (US)

(73) Assignee: Inphase Technologies, Inc., Longmont, CO (US)

( * ) Notice: Subject to any disclaimer, the term of this patent is extended or adjusted under 35 U.S.C. 154(b) by 329 days.

(21) Appl. No.: 11/440,447

(22) Filed: May 25, 2006

(65) Prior Publication Data

US 2006/0279823 A1 Dec. 14, 2006

Related U.S. Application Data

(60) Provisional application No. 60/684,531, filed on May 26, 2005.

(51) Int. Cl.
*G03H 1/12* (2006.01)
*G03H 1/26* (2006.01)
*G03H 1/22* (2006.01)

(52) U.S. Cl. .............................. 359/11; 359/22; 359/32

(58) Field of Classification Search ............... 359/22, 359/24, 25, 32, 11
See application file for complete search history.

(56) References Cited

U.S. PATENT DOCUMENTS

| | | | |
|---|---|---|---|
| 5,058,124 A | 10/1991 | Cameron et al. | |
| 5,066,088 A | 11/1991 | Davies et al. | |
| 5,123,073 A | 6/1992 | Pimpinella | |
| 5,499,732 A | 3/1996 | Nishimoto | |
| 5,500,910 A | 3/1996 | Boudreau et al. | |
| 5,692,083 A | 11/1997 | Bennett | |
| 5,710,672 A | 1/1998 | Roberts et al. | |
| 5,719,691 A | 2/1998 | Curtis et al. | |
| 5,774,240 A * | 6/1998 | Goto et al. | ..................... 359/12 |
| 5,793,504 A * | 8/1998 | Stoll | ........................... 359/11 |
| 5,886,971 A | 3/1999 | Feldman et al. | |

(Continued)

FOREIGN PATENT DOCUMENTS

WO WO 2005/059902 A3 6/2005

OTHER PUBLICATIONS

Y. Nakayama, et al., "Diffuser with Pseudorandom Phase Sequence," *Opt. Soc. Am.*, vol. 69 (No. 10), (Oct. 1979), pp. 1367-1372.

(Continued)

*Primary Examiner*—Alessandro Amari
(74) *Attorney, Agent, or Firm*—Jagtiani + Guttag

(57) ABSTRACT

Methods and systems are provided for obtaining a phase conjugate reconstruction beam for use in retrieving holographic information from a holographic storage medium. These methods and systems include generating a coherent light beam that is a reproduction of the reference beam used in storing the holographic information in the storage medium. This coherent light beam is then directed through the holographic storage medium at the same angle and location of the reference beam during recording of the hologram. The directed coherent beam is then reflected back through the storage medium so that the reflected coherent light beam provides a phase conjugate of the reference beam and passes through the storage medium at the same angle and location that the reference beam passed through the storage medium during recordation of the hologram.

23 Claims, 11 Drawing Sheets

U.S. PATENT DOCUMENTS

| | | | |
|---|---|---|---|
| 5,912,872 | A | 6/1999 | Feldman et al. |
| 5,932,045 | A | 8/1999 | Campbell et al. |
| 5,956,106 | A | 9/1999 | Peterson et al. |
| 6,047,008 | A | 4/2000 | Funakawa |
| 6,081,381 | A | 6/2000 | Shalapenok et al. |
| 6,103,454 | A | 8/2000 | Dhar et al. |
| 6,104,690 | A | 8/2000 | Feldman et al. |
| 6,137,601 | A | 10/2000 | Khoury et al. |
| 6,265,240 | B1 | 7/2001 | Dautartas et al. |
| 6,344,148 | B1 | 2/2002 | Park et al. |
| 6,389,045 | B1 | 5/2002 | Mann et al. |
| 6,414,763 | B1 | 7/2002 | Hesselink et al. |
| 6,449,627 | B1 | 9/2002 | Baer et al. |
| 6,482,551 | B1 | 11/2002 | Dhar et al. |
| 6,614,566 | B1 | 9/2003 | Curtis et al. |
| 6,650,447 | B2 | 11/2003 | Curtis et al. |
| 6,743,552 | B2 | 6/2004 | Setthachayanon et al. |
| 6,747,257 | B1 | 6/2004 | Farnsworth et al. |
| 6,765,061 | B2 | 7/2004 | Dhar et al. |
| 6,768,426 | B2 | 7/2004 | Nekado et al. |
| 6,780,546 | B2 | 8/2004 | Trentler et al. |
| 6,796,697 | B1 | 9/2004 | Bragg et al. |
| 6,862,121 | B2 | 3/2005 | Psaltis et al. |
| 6,909,529 | B2 | 6/2005 | Curtis |
| 6,925,225 | B2 | 8/2005 | Engel et al. |
| 6,956,998 | B2 | 10/2005 | Shahar et al. |
| 6,992,805 | B2 | 1/2006 | Ingwall et al. |
| 7,027,197 | B2 | 4/2006 | Newswanger et al. |
| 7,092,133 | B2 | 8/2006 | Anderson et al. |
| 2003/0206320 | A1 | 11/2003 | Cole et al. |
| 2004/0027625 | A1 | 2/2004 | Trentler et al. |
| 2004/0027668 | A1 | 2/2004 | Ayres |
| 2004/0223330 | A1 | 11/2004 | Broude et al. |
| 2005/0013231 | A1 | 1/2005 | Kawano et al. |
| 2005/0041000 | A1 | 2/2005 | Plut |
| 2005/0141810 | A1 | 6/2005 | Vaez-Iravani et al. |
| 2005/0146762 | A1 | 7/2005 | Hoogland et al. |
| 2005/0190451 | A1 | 9/2005 | Hansen |
| 2005/0270855 | A1 | 12/2005 | Earhart et al. |
| 2005/0270856 | A1 | 12/2005 | Earhart et al. |
| 2005/0286388 | A1 | 12/2005 | Ayres et al. |
| 2006/0274393 | A1 | 12/2006 | Fotheringham et al. |
| 2006/0274394 | A1 | 12/2006 | Riley et al. |
| 2006/0275670 | A1 | 12/2006 | Riley et al. |
| 2006/0279818 | A1 | 12/2006 | Ayres et al. |
| 2006/0279819 | A1 | 12/2006 | Krneta et al. |
| 2006/0279820 | A1 | 12/2006 | Riley et al. |
| 2006/0279821 | A1 | 12/2006 | Riley et al. |
| 2006/0279822 | A1 | 12/2006 | Kmeta et al. |
| 2006/0279823 | A1 | 12/2006 | Riley et al. |
| 2006/0279824 | A1 | 12/2006 | Riley et al. |
| 2006/0280096 | A1 | 12/2006 | Riley et al. |
| 2006/0281021 | A1 | 12/2006 | Riley et al. |
| 2006/0291022 | A1 | 12/2006 | Redmond et al. |
| 2006/0291023 | A1 | 12/2006 | Riley et al. |

OTHER PUBLICATIONS

Smothers, et al., "Photopolymers for Holography," *SPIE OE/Laser Conference*, (Los Angeles, Calif., 1990), pp. 1212:-03.

Psaltis, et al., "Holographic Memories," *Scientific American*, Nov. 1995.

Dhar, L., et al., "Recording Media That Exhibit High Dynamic Range for Holographic Storage," *Optics Letters*, 24, (1999): pp. 487 et. seq.

Dickey, "Laser Beam Shaping," Optics & Photonics News (Apr. 2003), pp. 30-35.

Masters, A., et al., "Beam-Shaping Optics Expand Excimer Laser Applications," Laser Focus World (Jun. 2005).

Fuertes, J.M., et al., "Absolute Type Shaft Encoding Using LFSR Sequences With Prescribed Length".

McLeod, et al. "Mirco-Holographic Multi-Layer Optical Disk Data Storage," *International Symposium on Optical Memory and Optical Data Storage* (Jul. 2005).

Shelby, "Media Requirements for Digital Holographic Data Storage," *Holographic Data Storage*, Section 1.3 (Coufal, Psaltis, Sincerbox Eds. 2003).

PCT/US2007/06094 International Search Report and the Written Opinion of the International Searching Authority, or the Declaration, mailed Aug. 22, 2008.

PCT/US2006/19906 International Search Report and the Written Opinion of the International Searching Authority, or the Declaration, mailed Sep. 16, 2008.

\* cited by examiner

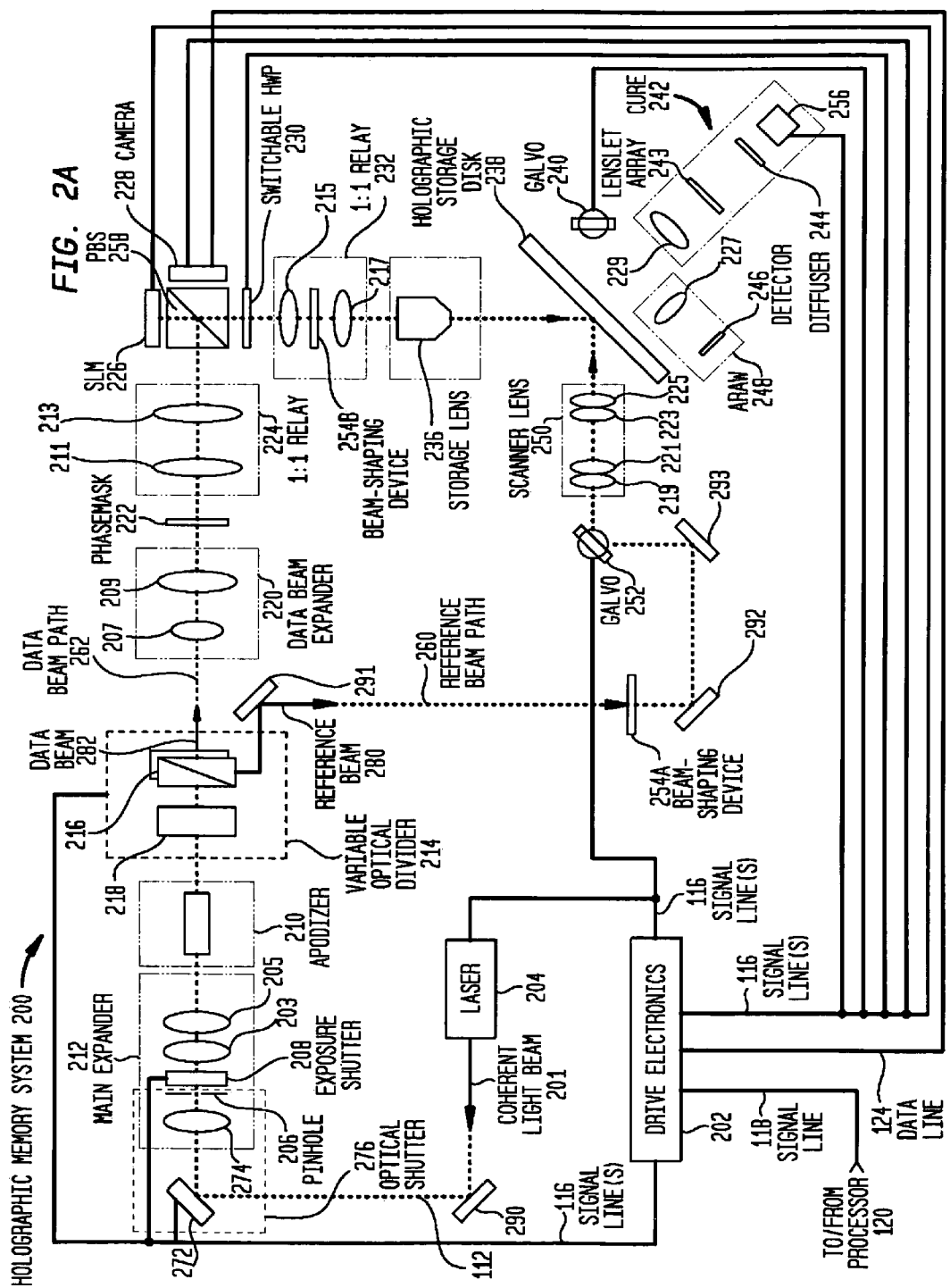

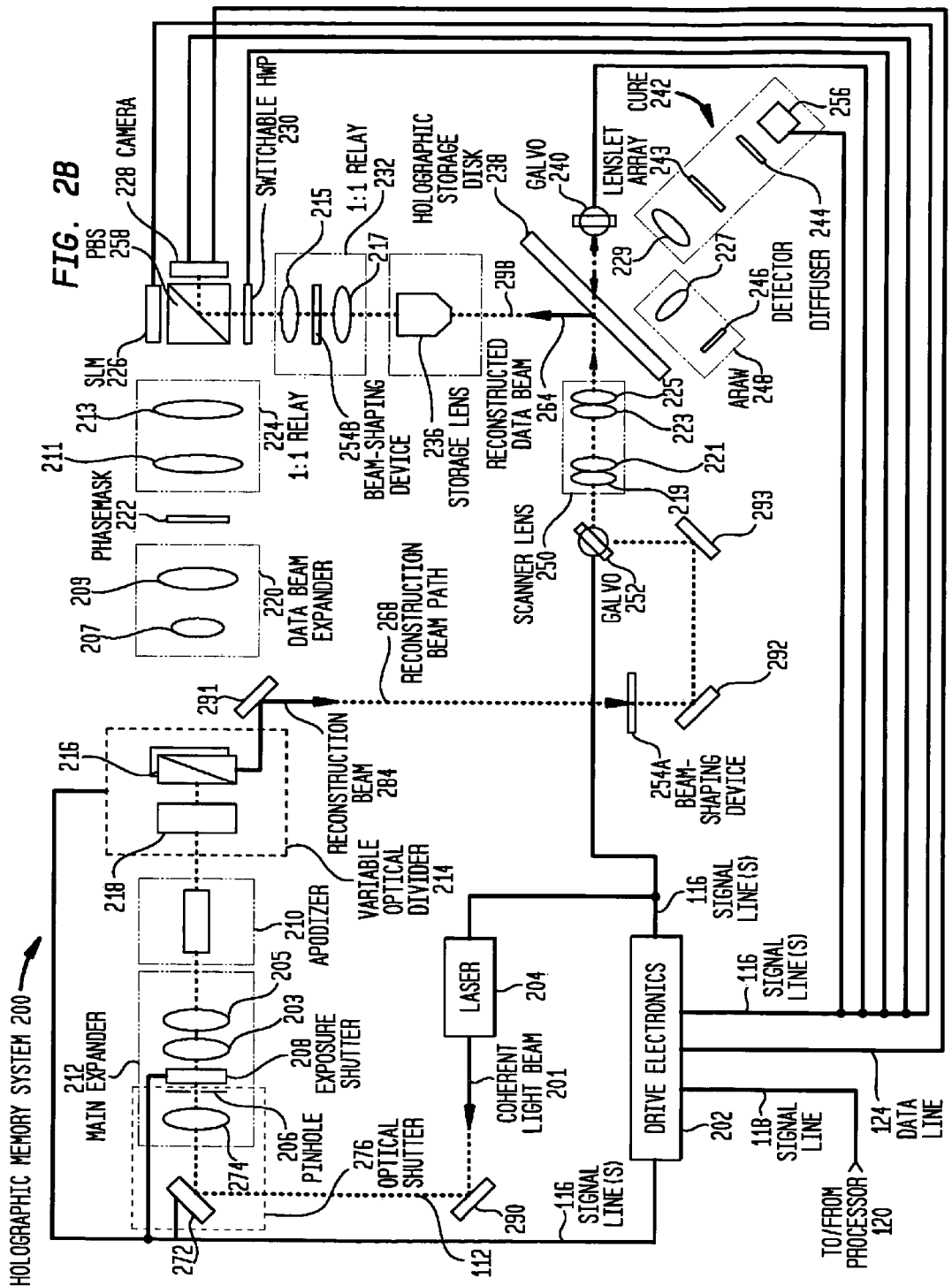

PHASE CONJUGATE RECONSTRUCTION OF A HOLOGRAM

CROSS-REFERENCE TO RELATED APPLICATIONS

This application makes reference to and claims the benefit of the following co-pending U.S. Provisional Patent Application No. 60/684,531 filed May 26, 2005. The entire disclosure and contents of the foregoing Provisional Application is hereby incorporated by reference. This application also makes reference to the following co-pending U.S. patent applications. The first application is U.S. application Ser. No. 11/440,370, entitled "Illuminative Treatment of Holographic Media," filed May 25, 2006. The second application is U.S. application Ser. No. 11/440,446, entitled "Methods and Systems for Laser Mode Stabilization," filed May 25, 2006. The third application is U.S. application Ser. No. 11/440,448, entitled "Improved Operational Mode Performance of a Holographic Memory System," filed May 25, 2006. The fourth application is U.S. application Ser. No. 11/440,359, entitled "Holographic Drive Head and Component Alignment," filed May 25, 2006. The fifth application is U.S. application Ser. No. 11/440,358, entitled "Optical Delay Line in Holographic Drive," filed May 25, 2006. The sixth application is U.S. application Ser. No. 11/440,357, entitled "Controlling the Transmission Amplitude Profile of a Coherent Light Beam in a Holographic Memory System," filed May 25, 2006. The seventh application is U.S. application Ser. No. 11/440,372, entitled "Sensing Absolute Position of an Encoded Object," filed May 25, 2006. The eighth application is U.S. application Ser. No. 11/440,371, entitled "Sensing Potential Problems in a Holographic Memory System," filed May 25, 2006. The ninth application is U.S. application Ser. No. 11/440,367, entitled "Post-Curing of Holographic Media," filed May 25, 2006. The tenth application is U.S. application Ser. No. 11/440,366, entitled "Erasing Holographic Media," filed May 25, 2006. The eleventh application is U.S. application Ser. No. 11/440,365, entitled "Laser Mode Stabilization Using an Etalon," filed May 25, 2006. The twelfth application is U.S. application Ser. No. 11/440,369, entitled "Holographic Drive Head Alignments," filed May 25, 2006. The thirteenth application is U.S. application Ser. No. 11/440,368, entitled "Replacement and Alignment of Laser," filed May 25, 2006. The entire disclosure and contents of the foregoing U.S. patent applications are hereby incorporated by reference.

BACKGROUND

1. Field of the Invention

The present invention relates generally to holographic systems, and more particularly, to phase conjugate reconstruction of a hologram.

2. Related Art

Developers of information storage devices continue to seek increased storage capacity. As part of this development, memory systems employing holographic optical techniques, referred to as holographic memory systems, have been suggested as alternatives to conventional memory devices.

Typically, holographic memory systems read/write data to/from a photosensitive storage medium. Such systems typically access holographic representations (that is, holograms) substantially throughout the spatial extent of the storage medium. This allows holographic systems to advantageously store a large amount of data.

Holographic memory systems may be designed to record data as single bits of information (i.e., bit-wise data storage). See McLeod et al. "Micro-Holographic Multi-Layer Optical Disk Data Storage," *International Symposium on Optical Memory and Optical Data Storage* (Jul. 2005). Holographic memory systems may also be designed to record an array of data that may be a 1-dimensional linear array (i.e., a 1×N array, where N is the number linear data bits), or a 2-dimension array commonly referred to as a "page-wise" memory system. Page-wise memory systems may involve the storage and readout of an entire two-dimensional representation, e.g., a page of data.

Holographic systems typically involve the three-dimensional storage of holograms as a pattern of varying refractive index and/or absorption imprinted into the storage medium. In general, holographic systems operate to perform a data write (also referred to as a data record or data store operation, simply "write" operation herein) by combining two coherent light beams, such as laser beams, at a particular point within the storage medium. Specifically, a data-encoded light beam is combined with a reference light beam to create an interference pattern in the photosensitive storage medium. The interference pattern induces material alterations in the storage medium to form a hologram. The formation of the hologram is a function of the relative amplitudes, phase, coherence, and polarization states of the data-encoded and reference light beams. It is also dependent on the relative wavelength of the incident beams as well as the three dimensional geometry at which the data-encoded and reference light beams are projected into the storage medium.

Holographically-stored data is retrieved from the holographic memory system by performing a read (or reconstruction) of the stored data. The read operation is performed by projecting a reconstruction or probe beam into the storage medium at the same angle, wavelength, phase and position as the reference beam used to record the data, or compensated equivalents thereof. The hologram and the reconstruction beam interact to reconstruct the data beam. The reconstructed data beam is then detected by a sensor, such as a photodetector, sensor array, camera, etc. The reconstructed data is then processed for delivery to an output device.

In conventional systems, the reconstruction beam may be often created by a separate light source from that used to create the data beams and reference beams during write operations. This can significantly increase the costs of the holographic memory systems. Further, other prior systems, even when using the same light sources, may require expensive optics to reroute the light beams around the storage medium. The additional elements and space for such rerouting may also increase costs to the holographic memory system. As such, there is a need for improved methods and system for generating a reconstruction beam in holographic systems.

SUMMARY

According to a first broad aspect of the present invention, there is provided a system for use with a storage medium that holographically stores information. This system comprises:

a light source which generates a coherent light beam that is a reproduction of a reference beam used in storing information in the storage medium, wherein during the storing of the information, the reference beam passed through the storage medium at a particular location and angle;

a first mirror to direct the coherent light beam to pass through the storage medium from a first side to a second side of the storage medium to provide a directed coherent beam; and a second mirror to reflect the directed coherent beam to thereby provide a phase conjugate of the reference beam that passes through the storage medium from the second side to the first side at the same location and angle as the reference beam.

According to a second broad aspect of the present invention, there is provided a method for use with a storage medium that holographically stores information. This method comprises the following steps:

generating a coherent light beam that is a reproduction of a reference beam used in holographically storing information in the storage medium, wherein during the storing of the information, the reference beam passed through the storage medium at a particular location and angle and from a first side to a second side of the storage medium;

directing the coherent light beam towards a first side to pass through the storage medium from the first side to the second side to provide a directed coherent beam; and reflecting the directed coherent beam towards the second side to thereby provide a phase conjugate of the reference beam, wherein the phase conjugate of the reference beam passes through the storage medium from the second side to the first side of at the same location and angle as the reference beam.

According to a third broad aspect of the present invention, there is provided a system for use with a storage medium that holographically stores information. This system comprises:

means for generating a coherent light beam that is a reproduction of a reference beam used in holographically storing information in the storage medium, wherein during the storing of the information, the reference beam passed through the storage medium at a particular location and angle and from a first side to a second side of the storage medium;

a first means for directing the coherent light beam to pass through the storage medium from the first side to the second side to provide a directed coherent beam; and a second means for reflecting the directed coherent beam towards the second side to thereby provide a phase conjugate of the reference beam that passes through the storage medium from the second side to the first side at the same location and angle as the reference beam.

According to a fourth broad aspect of the present invention, there is provided a method for use with a storage medium that holographically stores information. This method comprises the following steps:

generating a coherent light beam that is a reproduction of a reference beam used in holographically storing information in the storage medium, wherein during the storing of the information, the reference beam passed through the storage medium at a particular location and angle and from a first side to a second side of the storage medium;

reflecting the coherent light beam with a first adjustable mirror towards a second adjustable mirror to provide a reflected coherent beam; and reflecting the reflected coherent beam reflected with a second adjustable mirror to provide a second reflected coherent beam which passes through the storage medium from the second side to the first side.

According to a fifth broad aspect of the present invention, there is provided a system for use with a storage medium that holographically stores information. This system comprises:

a light source which generates a coherent light beam that is a reproduction of a reference beam used in holographically storing information in the storage medium, wherein during the storing of the information, the reference beam passed through the storage medium at a particular location and angle and from a first side to a second side of the storage medium;

a first adjustable mirror to reflect the coherent light beam to provide a first reflected coherent beam; and a second adjustable mirror to reflect the first reflected coherent beam to provide a second reflected coherent beam, wherein the second adjustable mirror is adjustable so as to direct the second reflected beam to pass through the storage medium from the second side to the first side.

According to a sixth broad aspect of the present invention, there is provided a system for use with a storage medium that holographically stores information. This system comprises:

means for generating a coherent light beam that is a reproduction of a reference beam used in holographically storing information in the storage medium, wherein during the storing of the information, the reference beam passed through the storage medium at a particular location and angle and from a first side to a second side of the storage medium;

a first means for reflecting the coherent light beam to provide a first reflected coherent beam; and a second means for reflecting the first reflected coherent beam so as to pass through the storage medium from the second side to the first side.

BRIEF DESCRIPTION OF THE DRAWINGS

The invention will be described in conjunction with the accompanying drawings, in which:

FIG. 2A is an architectural block diagram of the components of a holographic memory system illustrating the optical paths utilized during write operations in accordance with one embodiment of the present invention;

FIG. 2B is an architectural block diagram of the components of a holographic memory system illustrating the optical paths utilized during read operations in accordance with one embodiment of the present invention;

DETAILED DESCRIPTION

Figure 1:
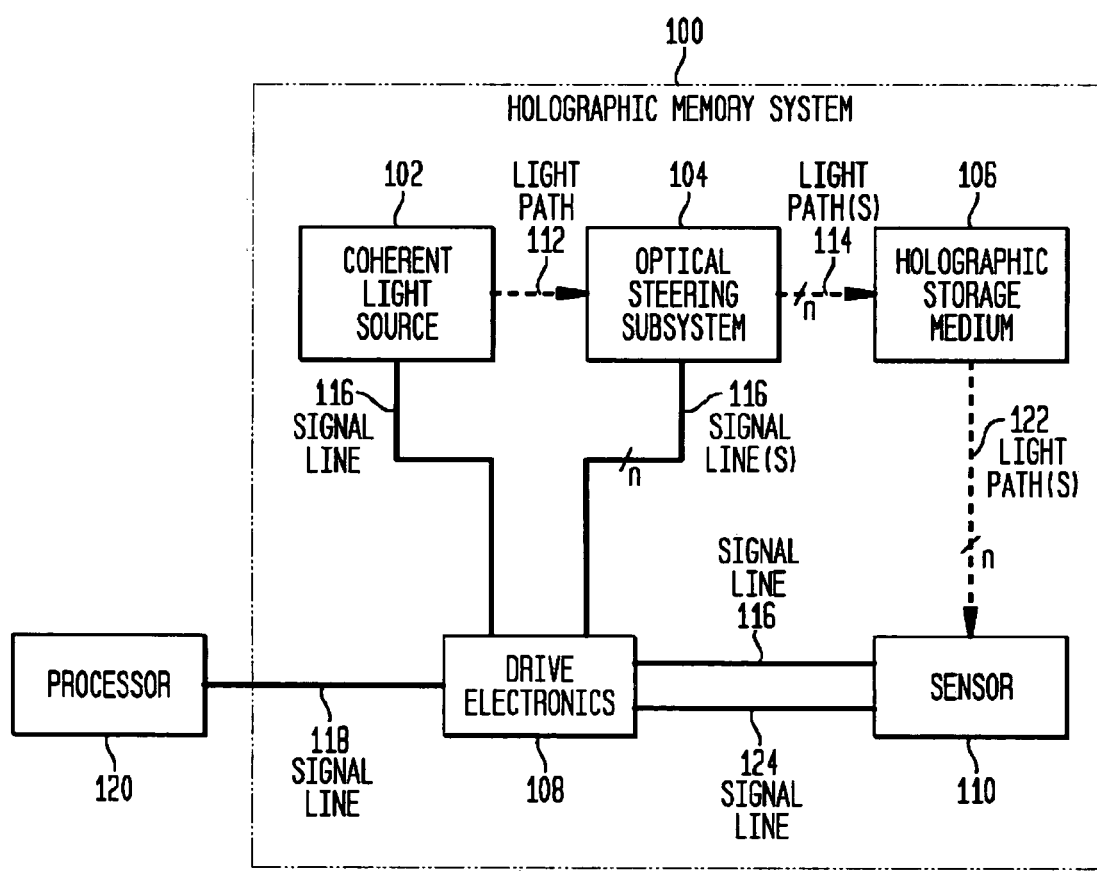
FIG. 1 is a block diagram of an exemplary holographic memory system in which embodiments of the present invention may be advantageously implemented.

It is advantageous to define several terms before describing the invention. It should be appreciated that the following definitions are used throughout this application.

Definitions

Where the definition of terms departs from the commonly used meaning of the term, applicant intends to utilize the definitions provided below, unless specifically indicated.

For the purposes of the present invention, the term "light source" refers to a source of electromagnetic radiation having, for example, a single wavelength or multiple wavelengths. The light source may be from a conventional laser, one or more laser diodes (LDs), etc.

For the purposes of the present invention, the term "spatial light intensity" refers to a light intensity distribution or pattern of varying light intensity within a given volume of space.

For the purposes of the present invention, the terms "holographic grating," "holograph" or "hologram" (collectively and interchangeably referred to hereafter as "hologram") are used in the conventional sense of referring to an interference pattern formed when a signal beam and a reference beam interfere with each other. In cases wherein digital data is recorded page-wise, the signal beam may be encoded with a data modulator, e.g., a spatial light modulator, etc.

For the purposes of the present invention, the term "holographic recording" refers to the act of recording a hologram in a holographic recording medium. The holographic recording may provide bit-wise storage (i.e., recording of one bit of data), may provide storage of a 1-dimensional linear array of data (i.e., a 1×N array, where N is the number linear data bits), or may provide 2-dimensional storage of a page of data.

For the purposes of the present invention, the term "storage medium" refers to any component, material, etc., capable of storing information, such as, for example a holographic storage medium.

For the purposes of the present invention, the term "holographic storage medium" refers to a component, material, etc., that is capable of recording and storing, in three dimensions (i.e., the X, Y and Z dimensions), one or more holograms (e.g., bit-wise, linear array-wise or page-wise) as one or more patterns of varying refractive index imprinted into the medium. Examples of holographic media useful herein include, but are not limited to, those described in: U.S. Pat. No. 6,103,454 (Dhar et al.), issued Aug. 15, 2000; U.S. Pat. No. 6,482,551 (Dhar et al.), issued Nov. 19, 2002; U.S. Pat. No. 6,650,447 (Curtis et al.), issued Nov. 18, 2003, U.S. Pat. No. 6,743,552 (Setthachayanon et al.), issued Jun. 1, 2004; U.S. Pat. No. 6,765,061 (Dhar et al.), Jul. 20, 2004; U.S. Pat. No. 6,780,546 (Trentler et al.), issued Aug. 24, 2004; U.S. Patent Application No. 2003-0206320, published Nov. 6, 2003, (Cole et al), and U.S. Patent Application No. 2004-0027625, published Feb. 12, 2004, the entire contents and disclosures of which are herein incorporated by reference.

For the purposes of the present invention, the term "data page" or "page" refers to the conventional meaning of data page as used with respect to holography. For example, a data page may be a page of data, one or more pictures, etc., to be recorded or recorded in a holographic medium.

For the purposes of the present invention, the term "recording light" refers to a light source used to record information, data, etc., into a holographic recording medium.

For the purposes of the present invention, the term "recording data" refers to storing or writing holographic data in a holographic medium.

For the purposes of the present invention, the term "reading data" refers to retrieving, recovering, or reconstructing holographic data stored in a holographic medium.

For the purposes of the present invention, the term "data modulator" refers to any device that is capable of optically representing data in one or two-dimensions from a signal beam.

For the purposes of the present invention, the term "spatial light modulator" (SLM) refers to a data modulator device that is an electronically controlled, active optical element.

For the purposes of the present invention, the term "refractive index profile" refers to a two-dimensional (X, Y) mapping of the refractive index pattern recorded in a holographic recording medium.

For the purposes of the present invention, the term "data beam" refers to a recording beam containing a data signal. As used herein, the term "data modulated beam" refers to a data beam that has been modulated by a modulator such as a spatial light modulator (SLM).

For the purposes of the present invention, the term "coherent light beam" refers to a beam of light including waves with a particular (e.g., constant) phase relationship, such as, for example, a laser beam.

For the purposes of the present invention, the term "reference beam" refers to a beam of light not including data. Exemplary reference beams include non-data bearing laser beams used while recording data to a holographic storage medium.

For the purposes of the present invention, the term "phase conjugate" when referring to a light beam refers to a light beam that is an exact replica of a second light beam, but propagating exactly in the reverse direction of the second light beam.

For the purposes of the present invention, the term "beam block" refers to any device capable of absorbing light, such as, for example, an incident light beam.

For the purposes of the present invention, the term "partially reflective surface" refers to any surface of an object capable of reflecting a portion of light while allowing another portion to pass through the surface.

For the purpose of the present invention, the term "waveplate" refers to any device that may be used to change the polarization of light. A waveplate is also sometimes referred to as a retarder and the terms may be used interchangeably herein. Exemplary waveplates, include a $\lambda/4$ waveplate that may be used, for example, to cause ¼ wavelength phase shift in a light beam that may result in changing linearly polarized light to circular and vice versa. Further, for example, a light beam twice passing through a $\lambda/4$ waveplate may undergo a 90 degree rotation in the linear polarization of the light.

Description

Embodiments of the invention may be used for generating a phase conjugate reference beam for use in holographic memory systems, such as, for example, data storage and retrieval systems that implement holographic optical techniques such as holographic memory systems.

FIG. 1 is a block diagram of an exemplary holographic memory system in which embodiments of the present invention may be implemented. It should be appreciated that although embodiments of the present invention will be described in the context of the exemplary holographic memory system shown in FIG. 1, the present invention may be implemented in connection with any system now or later developed that implements holographics.

Holographic memory system 100 receives along signal line 118 signals transmitted by an external processor 120 to read and write data to a photosensitive holographic storage medium 106. As shown in FIG. 1 processor 120 communicates with drive electronics 108 of holographic memory system 100. Processor 120 transmits signals based on the desired mode of operation of holographic memory system 100. For ease of description, the present invention will be described with reference to read and write operations of a holographic memory system. It should be apparent to one of ordinary skill in the art, however, that the present invention applies to other operational modes of a holographic memory system, such as Pre-Cure, Post-Cure, Write Verify, or any other operational mode implemented now or in the future in a holographic memory system.

Using control and data information from processor 120, drive electronics module 108 transmits signals along signal lines 116 to various components of holographic memory system 100. One such component that may receive signals from drive electronics 108 is coherent light source 102. Coherent light source 102 may be any light source now or later developed that generates a coherent light beam. In one embodiment of the invention, coherent light source 102 may be a laser.

A coherent light beam from coherent light source 102 is directed along light path 112 into an optical steering subsystem 104. Optical steering subsystem 104 directs one or more coherent light beams along one or more light paths 114 to holographic storage medium 106. In the write operational mode described further below, at least two coherent light beams are transmitted along two light paths 114 to create an interference pattern in holographic storage medium 106. The interference pattern induces material alterations in storage medium 106 to form a hologram.

In the read operational mode, holographically-stored data is retrieved from holographic storage medium 106 by projecting a reconstruction or probe beam along one light path 114 into storage medium 106. The hologram and the reconstruction beam interact to reconstruct the data beam which is transmitted along light path 298. The reconstructed data beam may be detected by a sensor 110. Sensor 110 may be any type of detector known or used in the art. In one embodiment, sensor 110 may be a camera. In another embodiment, sensor 110 may be a photodetector.

The light detected at sensor 110 is converted to a signal and transmitted to drive electronics 108 via signal line 124. Processor 120 then receives the requested data and/or related information from drive electronics 108 via signal line 118.

A more detailed description of the components of an exemplary embodiment of a holographic memory system 100 is presented next below with reference to FIGS. 2A and 2B. This holographic memory system is referred to herein as holographic memory system 200. FIGS. 2A and 2B are similar schematic block diagrams of the components of one embodiment of holographic memory system 200 illustrating the optical paths utilized during write and read operations, respectively.

Referring to the write mode configuration illustrated in FIG. 2A, coherent light source 102 (FIG. 1) is a laser 204. Laser 204 receives via signal line 116 control signals from an embodiment of drive electronics 108 (FIG. 1), referred to as drive electronics 202. In the illustrated write mode configuration, such a control signal causes laser 204 to generate a coherent light beam 201 which is directed along light path 112, introduced above with reference to FIG. 1.

Coherent light beam 201 is reflected by mirror 290 and is directed through optical shutter 276. Optical shutter 276 comprises beam deviation assembly 272, focusing lens 274 and pinhole 206 that are collectively controllable to shutter coherent light beam 201 from entering the remainder of optical steering subsystem 104.

Coherent light beam 201 passing through optical shutter 276 enters main expander assembly 212. Main expander assembly 212 includes lenses 203 and 205 to expand the light beam to a fixed diameter and to spatially filter the light beam. Main expander assembly 212 also includes lens 274 and pinhole 206 to spatially filter the light beam. An exposure shutter 208 within main expander assembly 212 is an electromechanical device that controls recording exposure times.

Upon exiting main expander assembly 212, coherent light beam 201 is directed through an apodizer 210. As is well-known in the art, light emitted from a laser such as laser 204 has a spatially varying distribution of light. Apodizer 210 converts this spatially varying intensity beam 201 from laser 204 into a more uniform beam with controlled edge profiles.

After passing through apodizer 210, coherent light beam 201 enters variable optical divider 214. Variable optical divider 214 uses a dynamically-controlled polarization device 218 and at least one polarizing beam splitter (PBS) 216 to redirect coherent light beam 201 into one or more discrete light beams transmitted along two light paths 114 (FIG. 1): light path 260 and light path 262. Variable optical divider 214 dynamically allocates the power of coherent light beam 201 among these discrete light beams 280 and 282. In the write operational mode shown in FIG. 2A, the discrete light beam directed along light path 260 is the noted reference light beam, referred to as reference light beam 280 (also referred to herein as reference beam 280), while the discrete light beam directed along light path 262 is the noted data light beam, referred to as data light beam 282 (also referred to herein as data beam 282).

Upon exiting variable optical divider 214, reference beam 280 is reflected by mirror 291 and directed through beam shaping device 254A position in reference path 260. After passing through beam shaping device 254A, reference beam 280 is reflected by mirrors 292 and 293 towards galvo mirror 252. Galvo mirror 252 reflects reference beam 280 into scanner lens assembly 250. Scanner lens assembly 250 has lenses 219, 221, 223 and 225 to pivotally direct reference beam 280 at holographic storage media 106, shown as holographic storage disk 238 in FIGS. 2A and 2B.

Returning attention to variable optical divider 214, data light beam 282 exits the variable optical divider and passes through data beam expander lens assembly 220. Data beam expander 220 implements lenses 207 and 209 to magnify data beam 282 to a diameter suitable for illuminating Spatial Light Modulator (SLM) 226, located further along data beam path 262. Data beam 282 illumination of phasemask 222 is then imaged onto SLM 226 via 1:1 relay 224 having lenses 211 and 213. PBS 258 directs data beam 282 onto SLM 226.

SLM 226 modulates data beam 282 to encode information into the data beam. SLM 226 receives the encoding information from drive electronics 202 via a signal line 116. Modulated data beam 282 is reflected from SLM 226 and passes through PBS 258 to a switchable half-wave plate 230. Switchable half-wave plate 230 may be used to optionally retard the polarization of data beam 282 by 90 degrees. A 1:1 relay 232 containing beam shaping device 254B and lenses 215 and 217 directs data beam 282 to storage lens 236 which produces a filtered Fourier transform of the SLM data inside holographic storage disk 238.

At a particular point within holographic storage disk 238, reference beam 280 and data light beam 282 create an interference pattern to record a hologram in holographic storage disk 238.

HMS 200 may further comprise an illuminative media cure subsystem 242. Media cure subsystem 242 is configured to provide a uniform curing beam with reduced coherence to storage disk 238 to pre-cure and/or post-cure a region of storage disk 238 following the writing process. Media cure subsystem 242 may comprise a laser 256 sequentially aligned with a diffuser 244, a lenslet array 243 and a lens 229. The light from laser 256 is processed by diffuser 244, lenslet array 243, and lens 229 to provide a uniform curing beam with reduced coherence prior to reaching storage disk 238

Holographic system 200 additionally comprises an associative read after write (ARAW) subsystem 248. ARAW subsystem 248 is configured to partially verify a hologram soon after the hologram is written to storage medium 106. ARAW subsystem comprises a lens 227 and a detector 246. Holographic system 200 uses ARAW subsystem 248 by illuminating a written hologram with an all-white data page. When a hologram is illuminated by this all-white data page, ARAW subsystem 248 detects the reconstructed reference beam resulting from this all-white illumination. Specifically, detector 246 examines the reconstructed reference beam to verify that the hologram has been recorded correctly.

Referring to the read mode configuration illustrated in FIG. 2B, laser 204 generates coherent light beam 201 in response to control signals received from drive electronics 202. As noted above, coherent light beam 201 is reflected by mirror 290 through optical shutter 276 that shutters coherent light beam 201 from entering the remainder of optical steering subsystem 104. Coherent light beam 201 thereafter enters main expander assembly 212 which expands and spatially filters the light beam, as described above with reference to FIG. 2A. Upon exiting main expander assembly 212, coherent light 201 is directed through apodizer 210 to convert the spatially varying intensity beam into a more uniform beam.

In the arrangement of FIG. 2B, when coherent light beam 201 enters variable optical divider 214, dynamically-controlled polarization device 218 and PBS 216 collectively redirect the coherent light beam into one discrete light beam 114, referred to as reconstruction beam 284. Reconstruction data beam 284 travels along reconstruction beam path 268, which is the same path 260 traveled by reference beam 280 during the write mode of operation, described above with reference to FIG. 2A.

A desired portion of the power of coherent light beam 201 is allocated to this single discrete light beam based on the selected polarization implemented in device 218. In certain embodiments, all of the power of coherent light beam 201 is allocated to reconstruction light beam 284 to maximize the speed at which data may be read from holographic storage disk 238.

Upon exiting variable optical divider 214, reconstruction beam 284 is directed by mirror 291 through beam shaping device 254A. After passing through beam shaping device 254A, reconstruction beam 284 is directed to scanner lens assembly 250 by mirrors 292 and 293, and galvo mirror 252. Scanner lens assembly 250 pivots reconstruction beam 284 at a desired angle toward storage disk 238.

During the read mode, reconstruction beam 284 passes through holographic storage disk 238 and is reflected back through the medium by a galvo mirror 240. As shown in FIG. 2B, the data reconstructed on this second pass through storage disk 238 is directed along reconstructed data beam path 298 as reconstructed data beam 264. As will be described in more detail below, in the present embodiment, the reflected reconstruction beam 284 is a phase conjugate of the reference light beam 280 used during write operations. This technique of using a phase conjugate of the write reference beam 280 during read operations is referred to as "phase conjugate readout." In this example, the reflected reconstruction beam 284 is an exact replica of the reference beam, but propagating exactly in the reverse direction of the originally recorded write reference beam 280 used to write the information to be read.

As is known to those of skill in the art, the term galvo mirror is shorthand for galvanometer mirror and refers to a mirror that may be mechanically rotated. For example, conjugate galvanometer mirror 240 may comprise a mirror attached to a motor. This motor may be connected to drive electronics 202 to enable drive electronics 202 to rotate (i.e., adjust the angle of) the mirror so that the mirror tracks the incident angle of reconstruction beam 284. That is, the angle of galvo mirror 240 tracks the angle of the incident reconstruction beam 284 so that galvo mirror 240 exactly reflects the incoming beam in the present embodiment. As noted above, the generated reconstruction beam 284 is a plane wave. Thus, in this embodiment, the reflected reconstruction beam 284 is a counter propagating plane wave overlapping storage disk 238 in the exact same location and at the same angle as the original reference beam used during write operations. As such, in the present embodiment, the reflected reconstruction beam 284 is a phase conjugate of the reference light beam 280 used during write operations.

The reflected reconstruction beam 284 (i.e., a phase conjugate of reference beam 280) then passes back through storage disk 238 at the same location it initially passed through storage disk 238 (i.e., prior to being reflected). The phase conjugate reconstruction beam 284 produces a phase conjugate reconstruction of the original data beam that propagates exactly retracing the original recording data beam. That is, data reconstructed on this second pass of the reconstruction beam 284 through storage disk 238 is directed along the original data path 262 as reconstructed data beam 264.

Reconstructed data beam 284 passes through storage lens 236 and 1:1 relay 232 to switchable half wave plate 230. Switchable half wave plate 230 is controlled by drive electronics 202 so as to have a negligible polarization effect. Reconstructed data beam 264 then travels through switchable half wave plate 230 to PBS 258, all of which are described above with reference to FIG. 2A. PBS 258 reflects reconstructed data beam 264 to an embodiment of sensor 110 (see FIG. 1) in the form of a camera 228. The light detected by camera 228 is converted to a signal and transmitted to drive electronics 202 via signal line 124 (see FIG. 1). Processor 120 then receives the requested data and/or related information from drive electronics 202 via signal line 118 (see FIG. 1).

Figure 3:
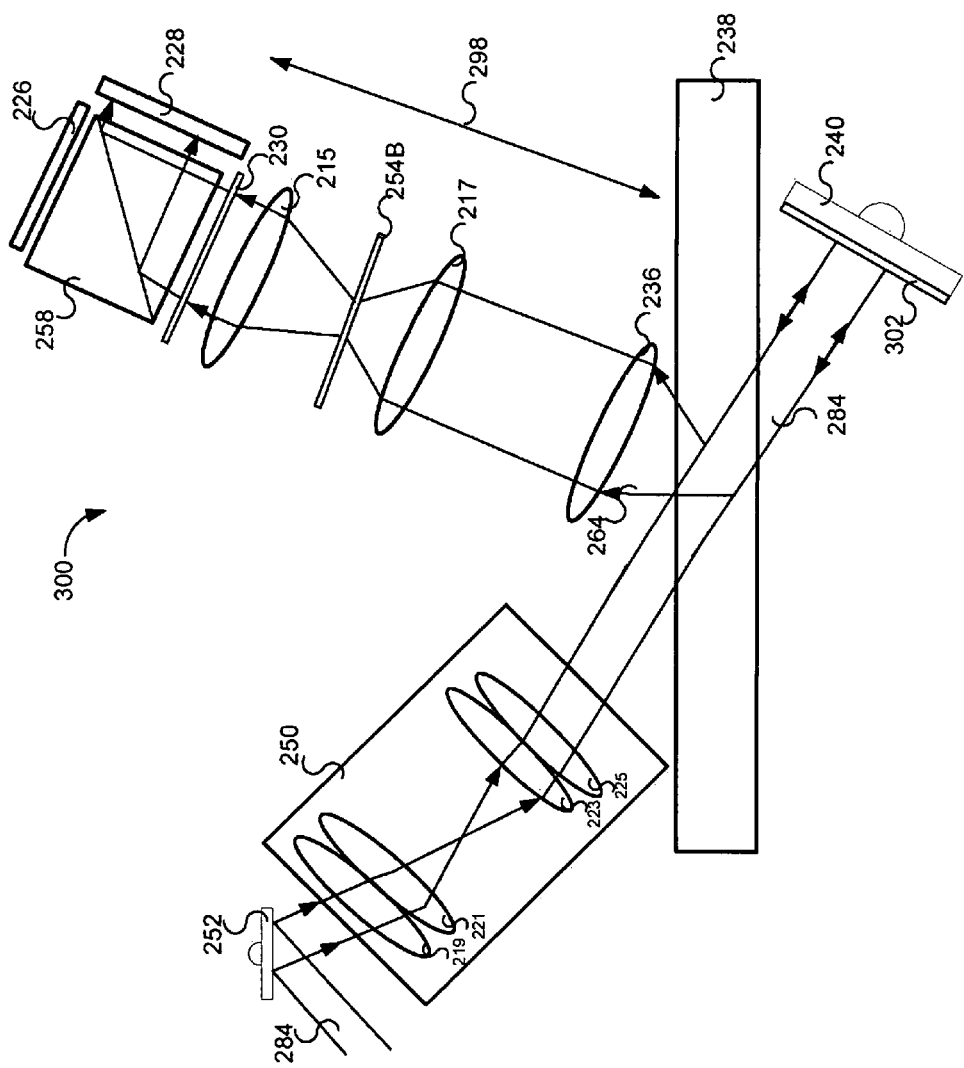
FIG. 3 illustrates a simplified diagram of an exemplary holographic memory system employing a waveplate, in accordance with one embodiment of the present invention.

FIG. 3 illustrates a simplified diagram of an exemplary holographic memory system 300 employing a waveplate, in accordance with an aspect of the invention. This simplified diagram may be identical to the holographic data system 100 of FIGS. 2A and 2B with the exception that this exemplary system employs a λ/4 waveplate 302. For simplicity, only the portions of FIG. 2 that will be discussed below are illustrated in this simplified diagram.

As illustrated, this simplified diagram also includes galvo mirror 252, scanner lens 250, holographic storage disk 238, lenses 215, 217, and 236, beam shaping device 254B, PBS 258, SLM 226, switchable HWP 230, and camera 228. Further, in this example, a λ/4 waveplate 302 is applied to the surface of the mirror of galvo mirror 240. This waveplate 302 is optional and need not be included in other embodiments. A further description of this optional waveplate 302 is provided below.

The following provides a description of how the exemplary system of FIG. 3 may generate a phase conjugate reference beam for reading information from holographic storage disk 238. As discussed above with reference to FIG. 2B, during read operations, at least a portion of the coherent light beam 201 generated by laser 204, referred to as reconstruction beam 284, is directed towards galvo mirror 252. Reconstruction beam 284 passes through scanner lens assembly 250 and holographic storage disk 238 where it is reflected back through disk 238 by galvo mirror 240. As noted above, this reflected back beam is a phase conjugate of reference beam 280 used during write operations to store the information to be read.

Reconstruction beam 284 also passes through an optional λ/4 waveplate 302 prior to passing back through storage disk 238, in the present embodiment. Waveplate 302 may be used to, for example, minimize reflections of reference beam 284 that may bounce off storage disk 238 and into data path 298 where they might be captured by camera 228. This may be accomplished by altering the linear polarization angle of reconstruction beam 284 so as to be orthogonal to the polarization of the reference beam 280 used during write operations. The portion of reconstruction beam 284 that passes through the holographic storage disk 238 then passes through the λ/4 waveplate 302 where its polarization is changed from linear to circular. Reflection off galvo mirror 240 subsequently reverses the direction of this circular polarization which is converted back to linear polarization when passing through λ/4 waveplate 302 a second time. This has the effect of rotating the linear polarization of reconstruction beam 284 by 90 degrees. That is, the linear polarization of reconstruction beam 284 passing back through holographic storage disk 238 has a linear polarization that has been rotated by 90 degrees from the linear polarization of the reconstruction beam 284 when it initially passed through storage disk 238. Thus, the portion of reconstruction beam 284 which illuminates holographic storage disk 238, generating reconstructed data beam 264, has the same polarization as the reference beam 280 used during write operations.

Therefore, in this example, the reconstructed data beam 264 and the portion of reconstruction beam 284 previously reflected off holographic storage disk 238 have orthogonal linear polarizations (i.e., linear polarizations offset by approximately 90 degrees). Because the polarizations are orthogonal, any portion of the reference beam 284 that is reflected along data path 298 will be directed away from camera 228 by PBS 258. As such, waveplate 302 helps to minimize errors that might result from reflections that may bounce off storage disk 238. Further, in some embodiments, rather than rotating the linear polarization by exactly 90 degrees, due to, for example, non-ideal conditions, waveplate 302 may rotate the linear polarization by approximately 90 degrees (e.g., between 80 and 100 degrees). Although in such an embodiment, some of the reflected portion of reconstruction beam 284 may not be directed away from camera 228 by PBS 258, the use of waveplate 302 may still offer improved performance.

Figure 4:
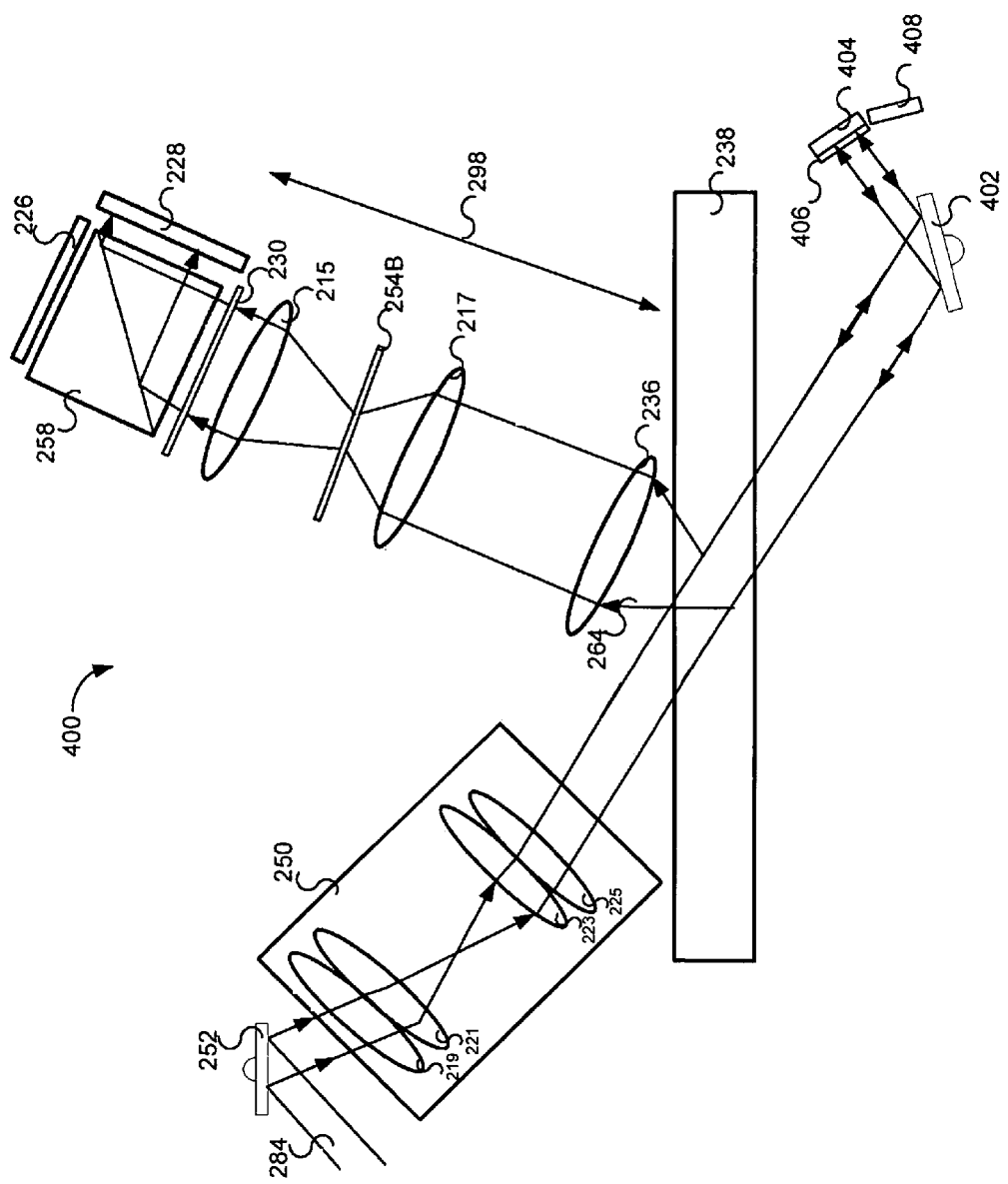
FIG. 4 illustrates a simplified diagram of an exemplary holographic memory system employing a fixed attached mirror and a waveplate, in accordance with one embodiment of the present invention.

FIG. 4 illustrates a simplified diagram of an exemplary holographic memory system 400 employing a fixed attached mirror and a waveplate in generating a phase conjugate reconstruction beam, in accordance with an embodiment of the present invention. This simplified diagram may be identical to the holographic memory system 200 of FIGS. 2A and 2B with the exception that this exemplary system employs a fixed mirror 404 and an optional beam block device 408. Further, as per the above embodiments, λ/4 waveplate 406 is optional.

In system 400, during read operations, a galvo mirror 402 in combination with fixed mirror 404 creates a phase conjugate reconstruction beam for use in retrieving the hologram from storage disk 238. After passing through storage disk 238, galvo mirror 402 reflects the incident reference beam 284 towards fixed mirror 404. As with the galvo mirrors discussed above with reference to FIGS. 2A, 2B, and 3, galvo mirror 402 may include a mirror attached to a motor that may be rotated by device electronics 202. During read operations, galvo mirror 402 is rotated (i.e., it "tracks" the angle of the incident reconstruction beam 284) so that galvo mirror 402 reflects the incident reconstruction beam 284 in the direction of and orthogonal to fixed mirror 404. Fixed mirror 404 then reflects the incident reconstruction beam 284, resulting in a reflected beam that is a phase conjugate of reference beam 280 used during write operations. The reflected reconstruction beam 284 is then reflected again by galvo mirror 404 so it passes back through storage disk 238 at the same location and angle as it initially passed through storage disk 238.

As with the embodiment discussed with reference to FIG. 3, holographic memory system 400 likewise includes an optional λ/4 waveplate 406 that may be used in conjunction with a mirror 404 to rotate the polarization of the reflected reconstruction beam 284 so that it is orthogonal to the write reference beam used during recordation of the hologram. As with the embodiment of FIG. 3, λ/4 waveplate 406 is optional and may be used to help minimize reflections of reconstruction beam 284 that may bounce off storage disk 238 and into the data path 298 where they might be captured by camera 228.

Figure 5:
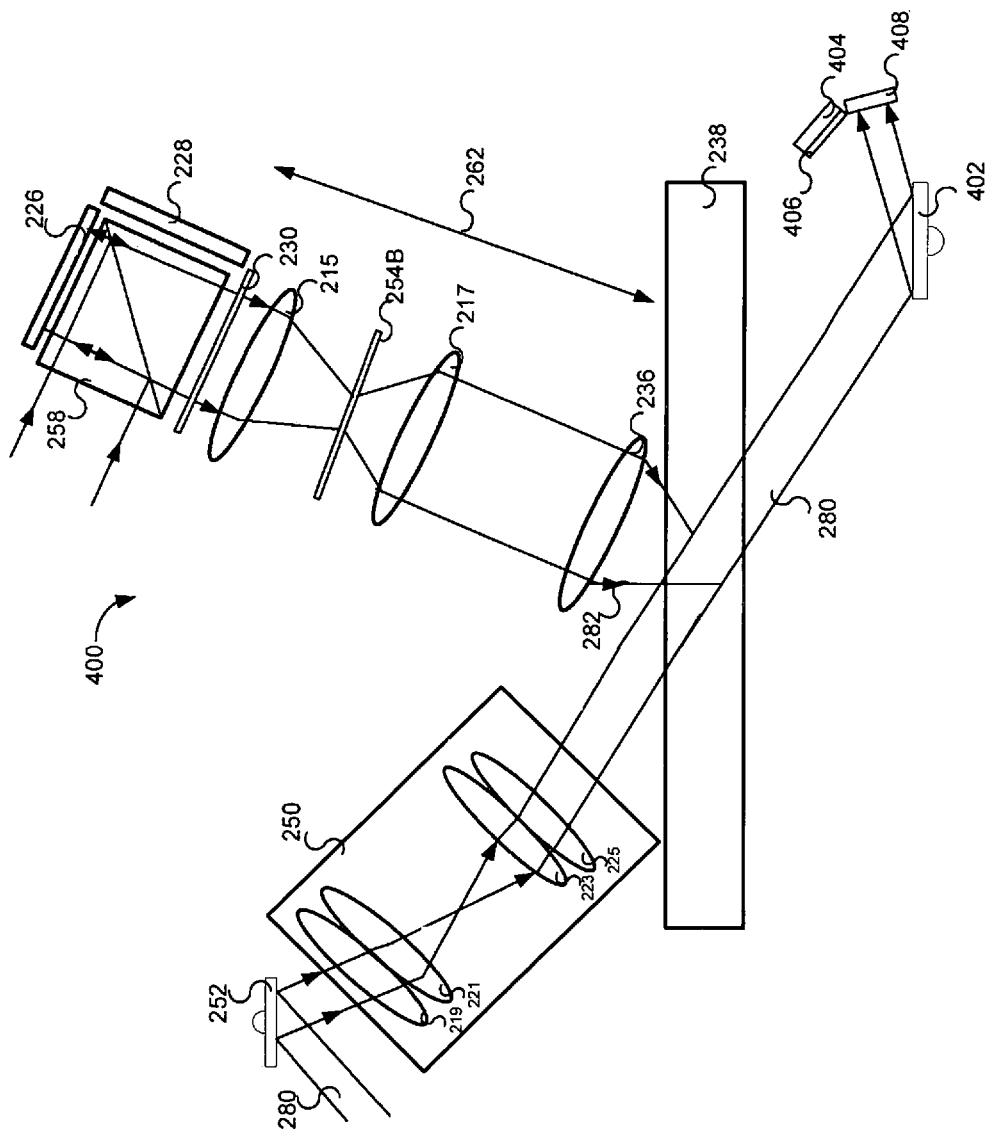
FIG. 5 illustrates a simplified diagram of the embodiment of FIG. 4 during write operations, in accordance with one embodiment of the present invention.

FIG. 4 also illustrates a beam block 408 that may be used during write operations. FIG. 5 illustrates a simplified diagram of this embodiment of FIG. 4 during write operations. Beam block 408 may be any device capable of absorbing an incident light beam (e.g., reference beam 280), such as, for example, a plate or block with a highly absorptive coating, a stack of sharp edged thin plates, or a plate or block of an optical material which absorbs a substantial fraction of incident light and is optionally coated with an anti-reflective coating. As shown, during write operations galvo mirror 402 is rotated so that it reflects the incident write reference beam 280 in the direction of the beam block 408, which absorbs reference beam 280, and accordingly helps minimize reflections that might introduce errors in writing the hologram. Further, as with during read operations, drive electronics 202 may be used to rotate the angle of galvo mirror 402 so that it tracks the angle of the incoming reference beam 280 so that the reflected incident reference beam 280 is orthogonal to beam block 408. Although described with reference to FIGS. 4 and 5, beam block 408 such as presently described may also be implemented in other embodiments, such as the embodiment of FIG. 3 and/or with additional optical components between galvo mirror 402 and beam block 408, such as, for example, lenses, mirrors, etc.

Figure 6:
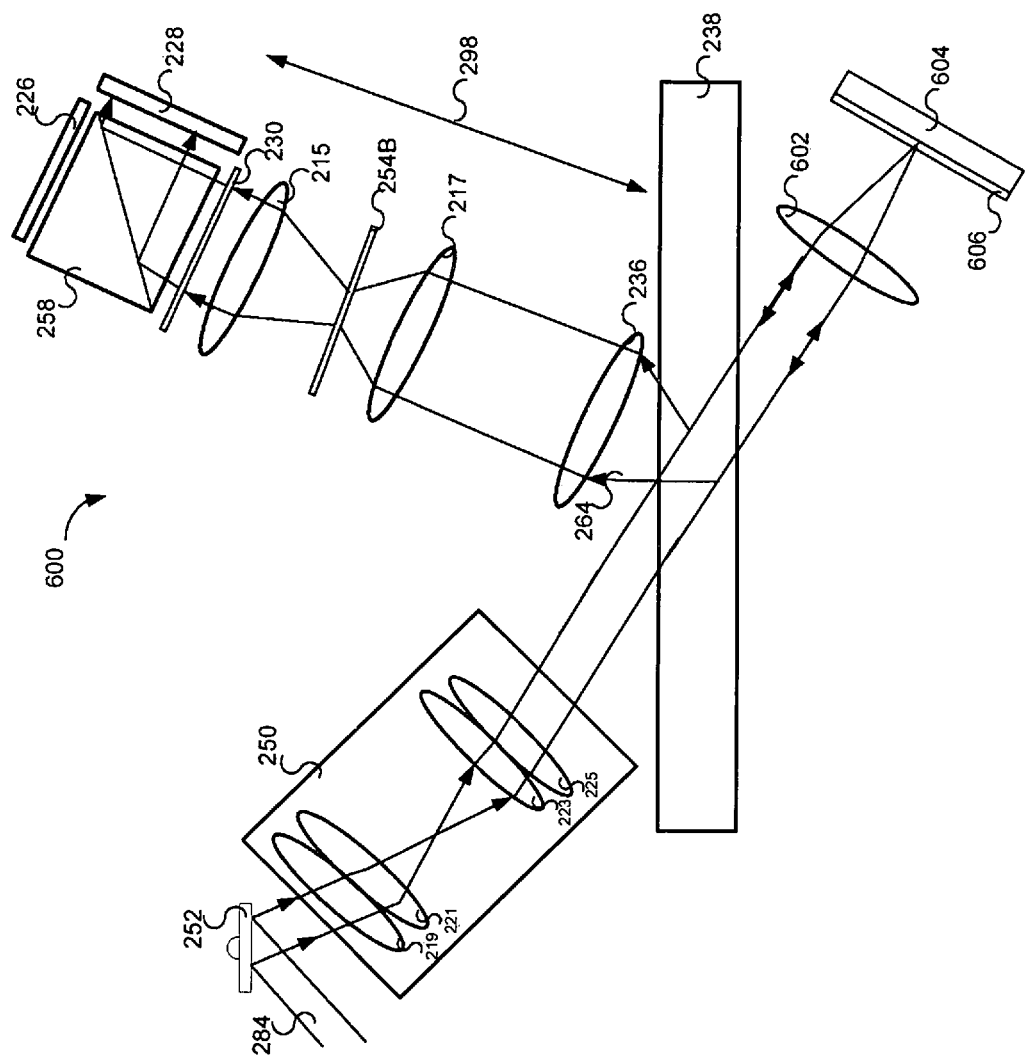
FIG. 6 illustrates a simplified diagram of an exemplary holographic memory system employing a fixed attached mirror and a lens, in accordance with one embodiment of the present invention.

FIG. 6 illustrates a simplified diagram of an exemplary holographic memory system 600 employing a fixed attached mirror and a lens in generating a phase conjugate reconstruction beam, in accordance with an embodiment of the present invention. Unlike the embodiments of FIGS. 3-5, this exemplary embodiment employs the combination of a lens 602 and a mirror 604 to reflect the incident reconstruction beam 284 back into storage disk 238 in place of a galvo mirror. Further, as with the above-discussed embodiments of FIGS. 3-5, system 600 may also use an optional λ/4 waveplate 606 to help minimize reflections of the reconstruction beam that may bounce off storage disk 238 and into the data path 298 and get captured by camera 228.

In system 600, after passing through storage disk 238, reconstruction beam 284 enters lens 602. This lens 602 preferably has a fixed location and may be any type of lens capable of focusing reconstruction beam 284 to a focal point. Further, lens 602 may be manufactured from any suitable material such as, for example, glass, plastic, silica, etc. Mirror 604 in system 600 is located at the focal point of lens 602 such that lens 602 focuses the reconstruction beam 284 directly on the surface of mirror 604. Mirror 604 as with the above discussed mirrors may be any type of device capable of reflecting a light beam. For example, mirror 604 may be a piece of glass, plastic, or other material with a reflective coating such as silver or aluminum.

Mirror 604 causes reconstruction beam 284 to invert and propagate back towards lens 602, which then recollimates beam 284. This resulting beam is accordingly a phase conjugate of the write reference beam 280, which then passes back through storage disk 238 at the same location and angle as it originally passed through storage disk 238.

A further embodiment of system 600 provides a mechanism for changing the optical path length between lens 602 and mirror 604 so as to shift the focal point away from the surface of mirror 604 (or vice versa). This has the primary effect of adding positive or negative wavefront curvature to the reconstruction beam 284 before it generates reconstructed data beam 264. The extent of change in the curvature of reconstruction beam 284 may be tuned to optimize the intensity of reconstructed data beam 264 by compensating for any residual curvature and/or other aberrations in reconstruction beam 284 relative to the extent of the curvature in the reference beam 280 used during write operations. This compensation may be desirable in the case where the holographic storage disk 238 was recorded in a different holographic memory system using a reference beam 280 with different wavefront curvature.

A further secondary effect of changing the wavefront curvature of the reconstruction beam 284 is that such a change may alter the effective magnification of the recorded data page from SLM 226 as imaged onto camera 228. This technique may be used to compensate, in part or in whole, for errors during read operations, such as, for example, the distance between camera 228 and PBS 258, variations in the manufacturing and/or alignment of lenses 236, 217, and/or 215 as compared from one holographic memory system to another, shrinkage of holographic storage disk 238, etc.

Various techniques for changing the wavefront curvature of reconstruction beam 284 may be used in system 600. For example, as noted above, curvature tuning may be accomplished by changing the location of the focal plane for lens 602 so as to shift the focal point away from the surface of mirror 604 (or vice versa). This focal point may be moved, for example, by changing the focal length of lens 602, adjusting the position of lens 602 and/or mirror 604, or altering the refractive properties of an optical device (e.g., a liquid crystal device) placed between lens 602 and mirror 604.

In another embodiment of system 600, mirror 604 may be replaced with a galvo mirror that during write operations may be rotated so that it redirects a write reference beam (not shown) away from storage disk 238, such as, for example, towards a beam block (e.g., such as beam block 408) such as described above.

Figure 7:
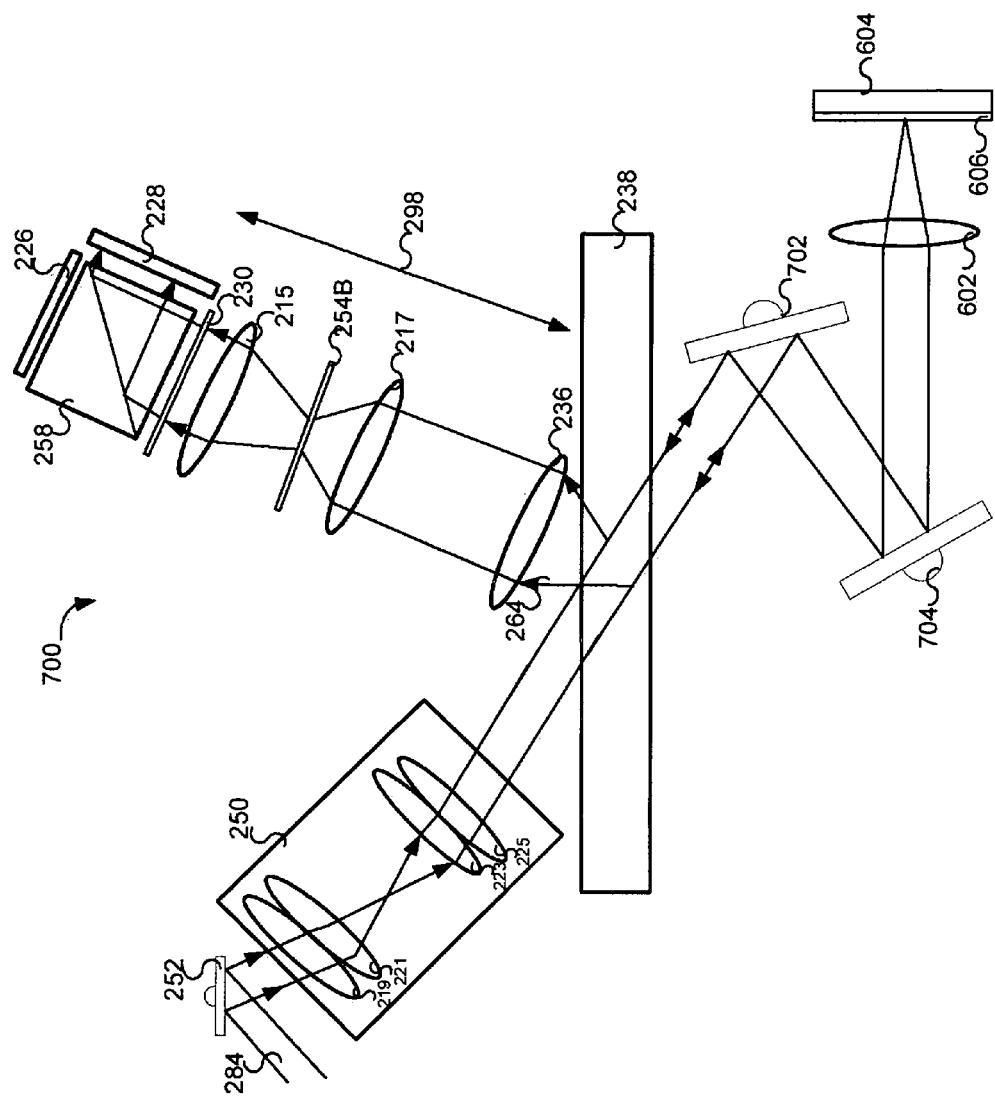
FIG. 7 illustrates a holographic memory system wherein a galvo mirror is inserted between a holographic storage medium and a lens, in accordance with one embodiment of the present invention.

FIG. 7 illustrates a holographic memory system 700 wherein galvo mirrors 702 and 704 are inserted between holographic storage disk 238 and lens 602. With the exception of galvo mirrors 702 and 704, this exemplary system may, for example, be identical or similar to system 600 of FIG. 6. In system 700, galvo mirror 702 reflects reconstruction beam 284, after it passes through holographic storage disk 238, towards galvo mirror 704, which then reflects reconstruction beam 284 to align and center reconstruction beam 284 on lens 602. Galvo mirrors 702 and 704 may be adjusted according to the angle which the reconstruction beam 284 leaves the holographic storage disk 238 so as to maintain a constant, or nearly constant, angle and position of the reconstruction beam 284 relative to lens 602. This may simplify the design, cost and complexity of lens 602 due to the limited range of incident angles required.

Figure 8:
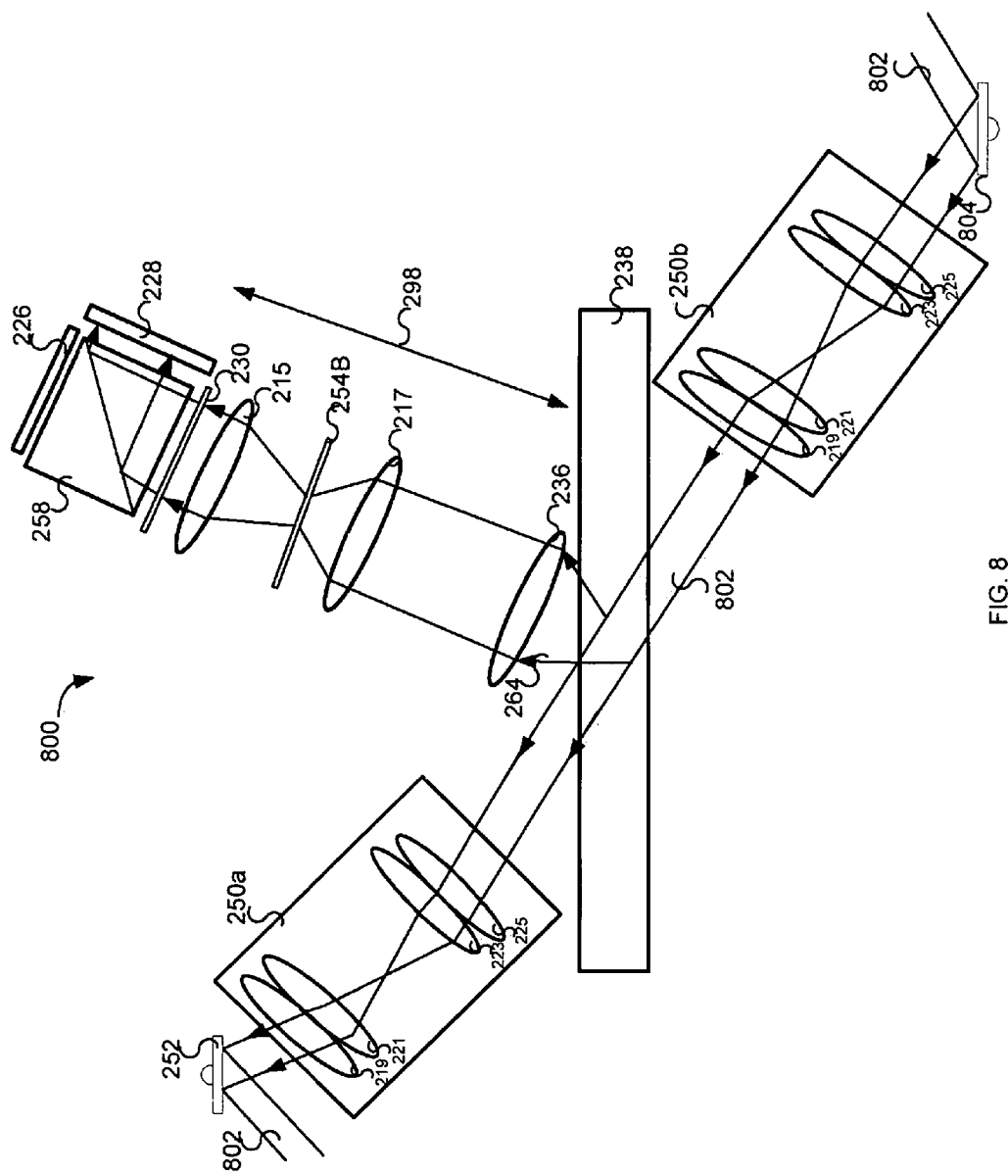
FIG. 8 illustrates a holographic memory system using two scanner lens assemblies in directing the reference beam into the storage medium, in accordance with one embodiment of the present invention.

FIG. 8 illustrates an exemplary holographic memory system 800 using two scanner lens assemblies 250a and 250b in directing the reference beam into the storage medium, in accordance with an aspect of the invention. FIG. 8 is a simplified figure and may be identical or similar to system 300 of FIG. 3, with the exception that in system 800, the reconstruction beam 802 does not pass through storage disk 238 twice, but instead only once. Further, in system 800, reconstruction beam 802 may be generated from a different light source than the light source used to generate reference beam 280 used during write operations. Or, for example, mirrors, lenses, or other devices may be used to direct reconstruction beam 802 towards galvo mirror 804. Reconstruction beam 802 is then redirected by galvo mirror 804 towards scanner lens assembly 250b which pivots reconstruction beam 802 at a desired angle toward holographic storage disk 238. Further, as with the above discussed embodiments of FIGS. 3-7, reconstruction beam 802 may be a phase conjugate of reference beam 800 used during write operations.

Figure 9:
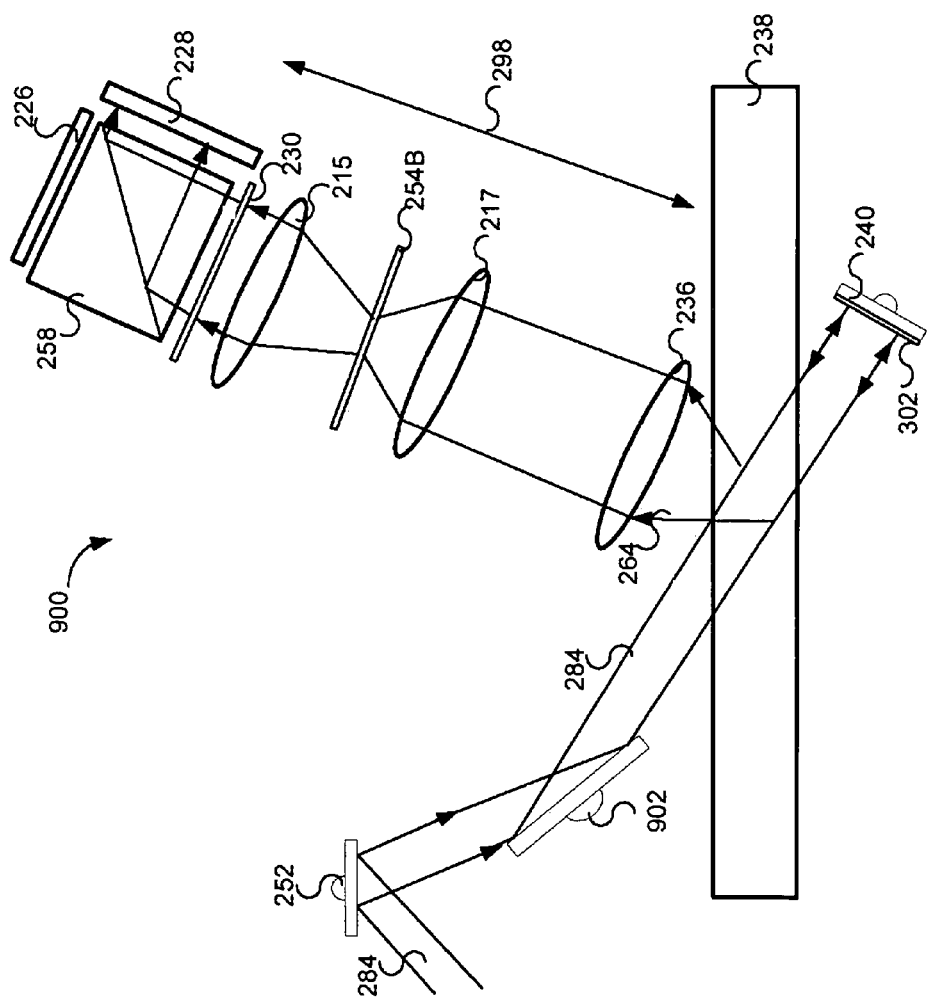
FIG. 9 illustrates a simplified diagram of an exemplary holographic memory system employing two galvo mirrors, in accordance with one embodiment of the present invention.

FIG. 9 illustrates an exemplary holographic memory system 900 using two galvo mirrors in directing the reference beam into storage disk 238, in accordance with an embodiment of the present invention. FIG. 9 is a simplified figure and may be identical or similar to system 300 of FIG. 3, with the exception that scanner lens assembly 250 is replaced by galvo mirror 902. As noted above, in system 200 of FIGS. 2A and 2B, scanner lens assembly 250 pivots reconstruction beam 284 at a desired angle toward storage disk 238. In system 900, galvo mirror 902 may be controlled by device electronics 202 (see FIG. 2B) to rotate galvo mirror 902 so that the light beams (e.g., reference beam 280 and reconstruction beam 284) are delivered to the holographic storage disk 238 at the proper angle and location. Galvo mirror 902 may be, for example, any type of rotatable mirror. For example, galvo mirror 902 may comprise an element (e.g., glass, plastic, etc) with a reflective coating (e.g., aluminum, silver, etc.) connected to a motor capable of rotating the galvo mirror.

Figure 10:
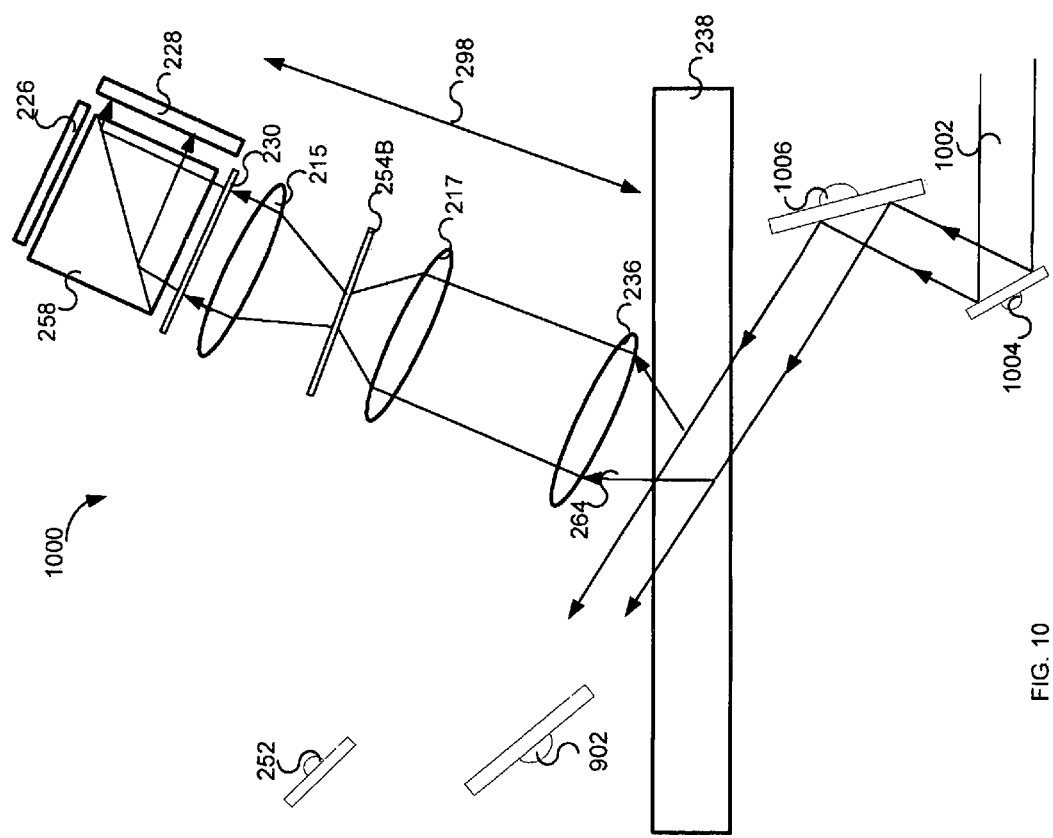
FIG. 10 illustrates an exemplary holographic memory system 800 of FIG. 8 using two galvo mirrors in directing a reconstruction beam into storage medium, in accordance with one embodiment of the present invention.

FIG. 10 illustrates an exemplary holographic memory system 1000 using two galvo mirrors in directing a reconstruction beam 284 into storage disk 238, in accordance with an embodiment of the present invention. System 1000 may be identical or similar to system 900 of FIG. 9 with the exception that in system 1000, the reconstruction beam 1002 does not pass through storage disk 238 twice, but instead only once. Further, in system 1000, reconstruction beam 1002 may be generated from a different light source than the light source used to generate the reference beam used during write operations. Or, for example, mirrors, lenses, or other devices may be used to direct reconstruction beam 1002 towards galvo mirror 1004. Reconstruction beam 1002 is then redirected by galvo mirror 1004 towards galvo mirror 1006, which in turn redirects reconstruction beam 1002 so that it arrives at the holographic storage disk 238 at the proper angle and location. Further, as with the above discussed embodiments of FIGS. 3-9, reconstruction beam 1002 may be a phase conjugate of the reference beam used during write operations. Further, galvo mirror 252 and galvo mirror 902 may be used during read operations to direct reconstruction beam 1002 towards a beam block (not shown), such as described above with reference to FIG. 5. Likewise, during write operations, galvo mirrors 1004 and 1006 may direct a write reference beam (not shown) towards a beam block such as described above Additionally, in an embodiment such as described with reference to systems 900 and 1000 of FIGS. 9 and 10, one of the mirrors 252 or 902 may be replaced with a prism mirror for obliquity correction, such as disclosed in U.S. patent application Ser. No. 10/751,871, entitled "Obliquity Correction Scanning Using a Prism Mirror," filed Jan. 5, 2004, which is hereby incorporated by reference. This prism mirror may include, for example, an anti-reflective coating on the incident/exit surface and a high reflective coating on its back surface. Further, in yet another embodiment, such as described with reference to system 1000 of FIG. 10, one of mirrors 1004 and 1006 may likewise be replaced with a prism mirror for obliquity correction.

All documents, patents, journal articles and other materials cited in the present application are hereby incorporated by reference.

Although the present invention has been fully described in conjunction with several embodiments thereof with reference to the accompanying drawings, it is to be understood that various changes and modifications may be apparent to those skilled in the art. Such changes and modifications are to be understood as included within the scope of the present invention as defined by the appended claims, unless they depart therefrom.

What is claimed is:

1. A method for use with a storage medium that holographically stores information, the method comprising the following steps of:
    generating a coherent light beam that is a reproduction of a reference beam used in holographically storing information in the storage medium, wherein during the storing of the information, the reference beam passed through the storage medium at a particular location and angle and from a first side to a second side of the storage medium;
    directing the coherent light beam towards the first side to pass through the storage medium from the first side to the second side to provide a directed coherent beam;
    reflecting the directed coherent beam towards the second side to thereby provide a phase conjugate of the reference beam that passes through the storage medium from the second side to the first side at the same location and angle as the reference beam; and
    changing a polarization of the directed coherent beam prior to the directed coherent beam passing through the storage medium from the second side to the first side.

2. The method of claim 1, wherein changing a polarization of the coherent beam comprises the step of:
    rotating a linear polarization of the directed coherent beam.

3. The method of claim 2, wherein rotating a linear polarization of the coherent beam comprises the step of:
    rotating the linear polarization of the coherent beam by 90 degrees.

4. The method of claim 1, further comprising the following step of:
    separating a reflected portion of the directed coherent beam from a reconstructed hologram.

5. The method of claim 1 further comprising the following step of:
    adjusting an angle of a first mirror to reflect the directed coherent beam to pass through the storage medium at the same angle and location as the reference beam.

6. A system for use with a storage medium that holographically stores information, the system comprising:
    a light source which generates a coherent light beam that is a reproduction of a reference beam used in storing information in the storage medium, wherein during the storing of the information, the reference beam passed through the storage medium at a particular location and angle and from a first side to a second side of the storage medium;
    a first mirror to direct the coherent light beam to pass through the storage medium from the first side to the second side to provide a directed coherent beam; and
    a second mirror to reflect the directed coherent beam to thereby provide a phase conjugate of the reference beam that passes through the storage medium from the second side to the first side at the same location and angle as the reference beam; and
    a waveplate configured to change a polarization of the directed coherent beam prior to the directed coherent beam passing through the storage medium from the second side to the first side.

7. The system of claim 6, further comprising:
    a polarization separation device configured to separate a reflected portion of the coherent beam from a reconstructed hologram.

8. The system of claim 7, wherein the waveplate rotates a linear polarization of the coherent beam.

9. The system of claim 8, wherein the waveplate rotates the linear polarization of the coherent beam by 90 degrees.

10. A system for use with a storage medium that holographically stores information, the system comprising:
    means for generating a coherent light beam that is a reproduction of a reference beam used in holographically storing information in the storage medium, wherein during the storing of the information, the reference beam passed through the storage medium at a particular location and angle and from a first side to a second side of the storage medium;
    a first means for directing the coherent light beam to pass through the storage medium from the first side to the second side to provide a directed coherent beam; and
    a second means for reflecting the directed coherent beam, to thereby provide a phase conjugate of the reference beam that passes through the storage medium from the second side to the first side and at the same location and angle as the reference beam; and
    means for changing a polarization of the directed coherent beam prior to the directed coherent beam passing through the storage medium from the second side to the first side.

11. The system of claim 10, wherein the means for changing a polarization of the coherent beam comprises:
    means for rotating a linear polarization of the directed coherent beam.

12. The system of claim 11, wherein the means for rotating a linear polarization of the coherent beam comprises:
means for rotating the linear polarization of the coherent beam by 90 degrees.

13. The system of claim 12, further comprising the following step of:
separating a reflected portion of the directed coherent beam from a reconstructed hologram.

14. A system for use with a storage medium that holographically stores information, the system comprising:
a light source which generates a coherent light beam that is a reproduction of a reference beam used in storing information in the storage medium, wherein during the storing of the information, the reference beam passed through the storage medium at a particular location and angle and from a first side to a second side of the storage medium;
a first mirror to direct the coherent light beam to pass through the storage medium from the first side to the second side to provide a directed coherent beam; and
a second mirror to reflect the directed coherent beam to thereby provide a phase conjugate of the reference beam that passes through the storage medium from the second side to the first side at the same location and angle as the reference beam, wherein the second mirror is an adjustable mirror that is capable of being adjusted so that the directed coherent beam is reflected to pass through the storage medium at the same angle and location as the reference beam.

15. The system of claim 14, further comprising:
a waveplate configured to change a polarization of the directed coherent beam prior to the directed coherent beam passing through the storage medium from the second side to the first side.

16. The system of claim 15, further comprising:
a polarization separation device configured to separate a reflected portion of the coherent beam from a reconstructed hologram.

17. The system of claim 15, wherein the waveplate rotates a linear polarization of the coherent beam.

18. The system of claim 17, wherein the waveplate rotates the linear polarization of the coherent beam by 90 degrees.

19. A system for use with a storage medium that holographically stores information, the system comprising:
means for generating a coherent light beam that is a reproduction of a reference beam used in holographically storing information in the storage medium, wherein during the storing of the information, the reference beam passed through the storage medium at a particular location and angle and from a first side to a second side of the storage medium;
a first means for directing the coherent light beam to pass through the storage medium from the first side to the second side to provide a directed coherent beam;
a second means for reflecting the directed coherent beam, to thereby provide a phase conjugate of the reference beam that passes through the storage medium from the second side to the first side and at the same location and angle as the reference beam; and
means for adjusting an angle of the second reflecting means so that the directed coherent beam is reflected to pass through the storage medium from the first side to the second side at the same angle and location as the reference beam.

20. The system of claim 19, further comprising:
means for changing a polarization of the directed coherent beam prior to the directed coherent beam passing through the storage medium from the second side to the first side.

21. The system of claim 20, wherein the means for changing a polarization of the coherent beam comprises:
means for rotating a linear polarization of the directed coherent beam.

22. The system of claim 21, wherein the means for rotating a linear polarization of the coherent beam comprises:
means for rotating the linear polarization of the coherent beam by 90 degrees.

23. The system of claim 20, further comprising the following step of:
separating a reflected portion of the directed coherent beam from a reconstructed hologram.

* * * * *